United States Patent [19]

Hiai et al.

[11] Patent Number: 4,983,462

[45] Date of Patent: Jan. 8, 1991

[54] METHOD FOR PREPARING ALUMINUM NITRIDE AND ITS SINTER

[75] Inventors: Atsuhiko Hiai, Takaishi; Kazuo Wakimura, Sennan; Masao Tanaka, Sakai; Takao Tanaka, Shimonoseki, all of Japan

[73] Assignee: Mitsui Toatsu Chemicals, Inc., Tokyo, Japan

[21] Appl. No.: 393,493

[22] Filed: Aug. 14, 1989

Related U.S. Application Data

[62] Division of Ser. No. 226,021, Jul. 29, 1988, Pat. No. 4,869,925.

[30] Foreign Application Priority Data

Jul. 29, 1987 [JP] Japan .................................. 62-187703
Apr. 1, 1988 [JP] Japan .................................. 65-78188
Apr. 1, 1988 [JP] Japan .................................. 63-78189

[51] Int. Cl.$^5$ .............................................. B32B 17/06
[52] U.S. Cl. ...................................... 428/432; 423/412; 428/426; 428/698; 428/699; 428/701; 428/901; 501/96; 501/98; 528/9
[58] Field of Search .............. 528/9; 423/412; 501/96, 501/98; 428/426, 432, 698, 701, 699, 901

[56] References Cited

U.S. PATENT DOCUMENTS

| | | | |
|---|---|---|---|
| 4,256,792 | 3/1981 | Koepke et al. | 428/119 |
| 4,435,513 | 3/1984 | Komeya et al. | 501/98 |
| 4,591,537 | 5/1986 | Aldinger et al. | 501/96 |
| 4,659,611 | 4/1987 | Iwase et al. | 428/698 |
| 4,740,574 | 4/1988 | Bolt et al. | 528/9 |
| 4,775,596 | 10/1988 | Holleran et al. | 428/901 |
| 4,783,430 | 11/1988 | Su | 423/412 |

*Primary Examiner*—Patrick J. Ryan
*Assistant Examiner*—Archene A. Turner
*Attorney, Agent, or Firm*—Millen, White & Zelano

[57] ABSTRACT

A method for preparing high-purity aluminum nitride having high thermal conductivity and heat resistance for aluminum nitride substrates, which comprises the steps of reacting an organic aluminum compound with an aminotriazine in a solvent to obtain an aluminum nitride precursor, separating the precursor form the solvent, and heating the precursor at a temperature of 600° C. or more in a reducing atmosphere and/or a non-oxidizing atmosphere. An aluminum nitride sinter is prepared by, if necessary, adding a sintering auxiliary to the above aluminum nitride powder, molding the powder into a desired shape, and then sintering the molded material at a temperature of 1,600° to 2,000° C. in a non-oxidizing atmosphere.

10 Claims, No Drawings

METHOD FOR PREPARING ALUMINUM NITRIDE AND ITS SINTER

This is a division of U.S. application Ser. No. 07/226,021, filed July 29, 1988, now U.S. Pat. No. 4,869,925.

BACKGROUND OF THE INVENTION

(1) Field of the Invention

The present invention relates to a method for preparing aluminum nitride. More particularly, it relates to a method for preparing high-purity aluminum nitride powder which is used suitably for aluminum nitride substrates and the like and in which oxygen and carbon contents are low, and it also relates to a sinter of the aluminum nitride powder.

(2) Description of the Prior Art

Recently, in the field of microelectronics, the trend is toward increased integration and output power increase and, for this reason, alumina substrates which have been heretofore used are already insufficient as heat release substrates on which semiconductors are mounted. In consequence, much attention is paid to aluminum nitride substrates as new heat release substrates having high thermal conductivity and heat resistance.

Conventional and known methods for preparing aluminum nitride powder for use in the aluminum nitride substrates are as follows:

(1) A method which comprises heating metallic aluminum in nitrogen or ammonia atmosphere.

(2) A method which comprises mixing alumina powder with carbon powder, and then heating the mixture in a nitrogen or ammonia atmosphere.

(3) A method which comprises thermally treating the reaction product of an organic aluminum and an amine.

In the case of the above-mentioned method (1), the melting point of aluminum and a nitrogenization temperature are close to each other, and therefore the product obtained thereby is solidified. Thus, a process for grinding the product is additionally necessary, and during this grinding process, the product is inconveniently susceptible to contaminated with impurities such as oxygen. Furthermore, since it is impossible to remove the impurities from the raw material aluminum, high-purity products are hardly manufactured. In the case of the alumina reduction process (2), impurities in the alumina and also coarse grains of alumina, if the latter is used as raw material, undesirably remain in the product. Thus, it is necessary that the raw material alumina has a high purity and is finely ground, which increases material costs. In addition, unreacted carbon is left in the product, and when the unreacted carbon is removed by oxidation, the aluminum nitride product is also partially oxidized disadvantageously.

In contradistinction, in method (3) the using an organic aluminum, this organic aluminum starting material is usually liquid, and a high-purity product is available with ease by distillation or the like. Thus, this method can prepare relatively high-purity aluminum nitride.

In fact, however, this method involves various other problems and hence it is not yet in commercial use. For example, Japanese laid open Patent Publication No. 1978-68700 discloses a method which comprises first reacting an organic aluminum compound with ammonia or a primary or secondary amine to form an aluminum nitride precursor, and heating the precursor at a temperature of 400° C. or more in an inert gas, in vacuo or an ammonia gas flow. However, this method has the drawback that a large amount of carbon remains in the thus produced aluminum nitride and, what is worse, the remaining carbon cannot be removed therefrom. Japanese laid open Patent Publication No. 1987-108720 discloses a method for preparing aluminum nitride which comprises first reacting a high-purity organic aluminum compound with an organic amine or hydradine in order to form an aluminum nitride precursor, and then carrying out primary baking in a non-oxidizing gas flow and secondary calcining at 1,150° C. or more in a hydrogen gas flow. According to this method, the much carbon-containing aluminum nitride which has been prepared by about the same method as in the above-mentioned Japanese laid open Patent Publication No. 1978-68700 is calcined secondarily in a reducing gas flow to remove carbon therefrom. However, in this method, hydrogen is used at a temperature of 1,150° C. or more, and therefore the method is not considered to be safe. Additionally, in this method, the calcination is carried out twice at the high temperature, which is not economical.

The problems associated with the above-mentioned method (3), including those described above, can be summarized as follows:

(a) In the produced aluminum nitride, carbon remains in large quantities.

(b) In order to remove the residual carbon content, heating must be carried out at 1,150° C. in hydrogen, which is very dangerous.

(c) When an after-treatment such as an air oxidation treatment is additionally used in order to remove the residual carbon, the amount of oxygen in the thus-obtained aluminum nitride increases.

(d) Fine particles cannot be manufactured with good controllability.

There therefore is a need for a method for simply and safely preparing fine-particle aluminum nitride containing less carbon and oxygen.

SUMMARY OF THE INVENTION

A main object of the present invention is to provide a method for preparing high-purity aluminum nitride powder in which oxygen content and remaining carbon content are low, without a particular after-treatment such as oxidation and without a process of removing carbon, and another object of the present invention is to provide a sinter prepared by molding and then sintering the aluminum nitride powder.

The method for preparing high-purity aluminum nitride comprises the steps of reacting an organic aluminum compound with an aminotriazine in a solvent to form an aluminum nitride precursor; separating the aluminum nitride precursor from the solvent; and heating/calcining the aluminum nitride precursor. The sinter of the present invention can be prepared by molding the thus obtained aluminum nitride powder into a desired shape and sintering the molded material.

DETAILED DESCRIPTION OF THE INVENTION

An organic aluminum compound used in the present invention is an alkylaluminum compound represented by the general formula $$R_n \cdot Al \cdot X_{3-n}$$

wherein R is a lower alkyl group having 1 to about 10 carbon atoms, such as, for example, a methyl group, an ethyl group, an iso-propyl group, an n-propyl group, an iso-butyl group and an n-butyl group; n is 1, 1.5, 2 or 3; and X is a hydrogen atom or a halogen atom, for example, fluorine, chlorine, bromine or iodine.

Preferable examples of alkylaluminum compound represented by the general formula include trialkylaluminum; dialkylaluminum monohalides, such as dialkylaluminum monochloride and dialkylaluminum monobromide; monoalkylaluminum dihalides, such as monoalkylaluminu3 dichloride and monoalkylaluminum dibromide; alkylaluminum sesquihalides, such as alkylaluminum sesquichloride and alkylaluminum sesquibromide; dialkylaluminum monohydride; and monoalkylaluminum dihydride.

The aminotriazine used in the present invention is an asym-triazine or sym-triazine having at least an amino group, and typical examples thereof include melamine, melam, melem, mellon, ammeline, ammelide, guanamine, 3-amino-asymtriazine, 6-amino-sym-triazine-2,4-diol, 4-amino-6-phenylsym-triazine-2-ol, 2,4-diamino-6-phenyl-sym-triazine, 3-amino-5,6-dimethyl-asym-triazine and 3-amino-5-phenylasym-triazine.

The solvent used in the present invention is preferably an organic solvent which is inactive with respect to the organic aluminum and the aminotriazine, and preferable examples thereof include benzene, toluene, hexane, liquid paraffins, heptane, pentane, octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethylpentane, 2,2,3-trimethylpentane, 2,2,4-trimethylpentane, 2,3,3-trimethylpentane, 2,3,4-trimethylpentane, isohexane, 3-methylpentane, neohexane and 2,3-dimethylbutane.

As described hereinbefore, the present invention comprises reacting the organic aluminum compound with the aminotriazine in the above-mentioned organic solvent. According to the preferable embodiment of the present invention, in reacting the organic aluminum compound with the aminotriazine, the aminotriazine is first dispersed in the organic solvent.

Under the conditions just described, the aminotriazine is present in the solid state and is not dissolved substantially in the organic solvent and thus the system becomes a slurry state. Afterward, the organic aluminum compound, which has or has not been diluted with the organic solvent is added to be slurry, and the resulting mixture is then stirred to perform the reaction.

The amount of the organic solvent employed is in the range of 5 to 200 ml, preferably 10 to 50 ml per 1 g of the aminotriazine. Furthermore, the organic aluminum compound is preferably used as a solution having a concentration of 1 to 100% by weight (i.e., undiluted).

The reaction proceeds in the form of a heterogeneous reaction system, i.e., a solid-liquid reaction between the solid of the aminotriazine and the liquid organic aluminum compound or solution thereof. During stirring, heating may be carried out, if desired. A heating temperature (reaction temperature) preferably is a temperature in the range of 10° to about 300° C. which is below the decomposition temperature of the organic aluminum compound.

In reacting both the raw materials with each other, if the amount of the aminotriazine is too small with respect to that of the organic aluminum compound, the latter compound remains in the reaction product, which is dangerous. Conversely, if the amount of the aminotriazine is too large, the proportion of the aminotriazine which does not take part in the production of aluminum nitride increases, which is not economical. In the reaction, therefore, the proportion of the organic aluminum compound, to the ,aminotriazine is preferably such that the molar ratio of the number of amino groups in the aminotriazine compound to the organic aluminum compound is in the range of from 0.1 to 100, preferably from 1 to 10. For example, when triethylaluminum is reacted with melamine under equimolar conditions, this molar ratio is 3.

As described above, as the reaction proceeds, an aluminum nitride precursor is produced.

This precursor is a compound having at least one Al-N bond and forms a white precipitate in the solvent which is used in the present invention. This white precipitate has the characteristics of the remaining alkylaluminum compound which is the raw material, and therefore it should be noted that the precursor is still active to the oxygen in air or to water.

The reaction progresses immediately when the alkylaluminum compound is added to the slurry of the aminotriazine. The period of time necessary for the reaction to go to completion is in the range of 30 minutes to 10 hours, preferably 1 hour to 5 hours.

The thus formed aluminum nitride precursor precipitate has excellent filtering characteristics. Therefore, the precipitate can be easily separated from the solvent by a usual solid-liquid separation technique such as filtration or decantation. In this case, even if the precursor precipitate contains the aminotriazine, there is no problem, because the aminotriazine can be eliminated therefrom in the next calcination process.

The thus separated aluminum nitride precursor precipitate, if necessary, is dried, and it is then converted into aluminum nitride in the next calcination process. As described above, this aluminum nitride precursor is easily oxidized in the atmosphere, with generation of heat. Accordingly, the precursor should be preserved in an inactive gas atmosphere such as a dried nitrogen atmosphere.

In the present invention, the aluminum nitride precursor is finally heated/calcined at a temperature of 600° to 1,800° C., preferably 800° to 1,500° C. in a calcination process using a furnace, so that aluminum nitride is prepared.

The heating/calcination process is preferably carried out in an atmosphere of a reducing gas such as ammonia or hydrogen; an inert gas such as nitrogen, argon, helium, neon, ethylene or ethane; or a mixed gas of the reducing gas and the inert gas. The concentration of the reducing gas in the mixed gas is preferably 10% or more, more preferably 30% or more. The rate of temperature rise is preferably in the range of 50° to about 500° C./hour.

For the precursor in the heating/calcination process, when differential thermal analysis is made, the decrease of weight and the appearance of an endothermic peak are observed even at 300° C., which is indicative of the fact that the precursor would be decomposed. However, the products calcined in the reducing gas atmosphere at a temperature less than 600° C. assumes a black color like charcoal. Judging from these facts, it seems that a perceptible amount of carbon content remains in the products, even though the precursor has been already decomposed (when the black powder was analyzed, the carbon content was about 22% by weight).

For example, when the calcination temperature in the reducing gas atmosphere is elevated to 600° C. or more, preferably 800° C., and furthermore up to 1,000° C., the color of the calcined products is gradually improved. For example, the products calcined at 1,000° C. for 3 hours assume a gray color which is nearly white (when the powder was analyzed, the carbon content was about 0.1% by weight).

This fact shows that the excess carbon atoms are reacted with the reducing gas, so that they are thereby eliminated from the powder.

A heating/calcination time is usually 1 to 20 hours, depending upon the temperature and the atmospheric gas employed.

When various aluminum nitride powders are observed by TEM (a transparent type electron microscope), it is realized that the deeper the black color is, the finer the powder particles are. According to observation under about 30,000-fold magnification, the powder looks like an aggregate of bubbles. However, as the particles of the powder grow, a whiteness degree increases, and under good conditions, the aggregate of the bubbles decreases and eventually it vanishes.

In this case, if the calcination atmosphere is made up of a non-oxidizing inert gas such as nitrogen, argon or helium, the above-mentioned change in the particle size is not seen so noticeably. The detailed functional mechanism of the above-mentioned phenomenon is not apparent, but it can be assumed that the reducing gas reacted with the carbon atoms as described above and, simultaneously with the elimination of these carbon atoms, the growth of the particles occurs. In other words, the above-mentioned phenomenon indicates that the reducing gas accelerates the growth of the particles in the calcination process.

In the thus obtained powder, the carbon content is 3.0% by weight or less, preferably 2.5% by weight or less, more preferably 0.2% by weight or less, and most preferably 0.1% by weight or less. In the present invention, a further decarbonizing process such as air oxidation which is usually used is substantially unnecessary. Moreover, in the present invention, oxygen-free compounds are used as the raw materials, and the process using oxygen is unnecessary. Therefore, in the aluminum nitride product, the oxygen content can be reduced to 0% by weight in principle. In fact, however, oxygen is adsorbed onto the powder surface and is introduced into the raw materials during handling the powder in the process, but even inclusive of such adsorption and introduction of oxygen, the oxygen content can be easily controlled so as to be a level of 0.8% by weight or less, preferably 0.5% by weight or less.

The above-mentioned operation permits obtaining aluminum nitride in which the carbon content is sufficiently low. However, when it is desired to further lower the carbon content in compliance with a specific purpose, or when the heating/calcination process is mainly carried out in the inert gas atmosphere, this aluminum nitride can be additionally heated an oxdizing gas atmosphere. As this oxdizing gas, air is usually used, and if necessary, oxygen or nitrogen is added thereto in order to adjust the oxygen concentration. The heating temperature is in the range of 600° to 900° C. When the heating temperature is higher than 900° C. the oxygen content in the produced aluminum, nitride is higher and the quality of the product thereby deteriorates. Conversely, when it is lower than 600° C., much time is required to achieve the oxidation, which is not economical.

In order to obtain particularly fine particles of aluminum nitride, the heating/calcination process is preferably divided into two steps, the first half step (primary calcination) being carried out in the reducing gas atmosphere, the second half step (secondary calcination) being carried out in the inert gas atmosphere.

In this calcination process, the primary calcination step is achieved by heating/calcining the aluminum nitride precursor at a temperature of 600° to 1,300° C. in a reducing gas atmosphere. This primary calcination step is as significant as the process of performing the decomposition of the precursor and the removal of remaining carbon in aluminum nitride. When the calcination temperature is less than 600° C., the residual carbon content in the precursor heightens. A temperature of 1,300° C. or less is preferable in that this temperature permits decreasing the remaining carbon content, is economical to inhibit the unnecessary growth of the particles, and permits adjusting the particle size of the aluminum nitride product.

Examples of the reducing gas employed include not only the reducing gases such as ammonia and hydrogen but also mixtures of these reducing gases and inert gases, such as nitrogen and the like. For example, in the case of a mixture of hydrogen and nitrogen, it is preferred that the amount of hydrogen therein is 30% or more.

The secondary calcination is achieved at a temperature of 1,400° to 1,650° C. in an inert gas atmosphere, examples of which include nitrogen, helium and argon. By carrying out the secondary calcination successively in the inert gas, the crystallinity of the aluminum nitride formed in the primary calcination can be improved, and the diameter of the particles can be uniformed. The inventors have found that when the calcination temperature is high, the sintering and rate is high the particle size is great, although the sintering rate is lower when an inert gas such as nitrogen is employed than when a reducing gas such as ammonia is employed Therefore, in an inert gas, the crystallinity can be improved with only a slight change in the particle size. In other words, this implies that the reducing gas has the function of accelerating the sinter growth of the particles, as described above.

In the thus obtained aluminum nitride powder, the carbon content is low, i.e., it is usually 0.2% by weight or less, preferably 0.1% by weight or less. Consequently, the after-treatment process of decarbonizing is not required, as described above.

When both the primary and secondary calcination steps are conducted, each calcination is preferably carried out at each temperature for 1 to about 10 hours. In this case, the rate of temperature rise is in the range of 50° to 500° C./hour.

The aluminum nitride powder, if necessary, is then mixed with a sintering auxiliary, is molded into a desired shape, and is sintered in order to prepare a sinter.

Examples of usable molding methods include known dry methods such as a monoaxial press and a rubber press; and known wet methods such as a doctor blade method and an extruding method. A hot press method in which molding and sintering are carried out simultaneously can be used.

For the purpose of preventing the oxidation of the aluminum nitride during sintering, the sintering operation is preferably carried out in a non-oxidizing atmosphere.

Examples of a usable gas for forming the non-oxidizing atmosphere are nitrogen, argon, a mixture of nitrogen and hydrogen, and a mixture of nitrogen and argon. In addition, a vacuum atmosphere can also be employed.

In an atmospheric sintering method, a powder bed method is preferably used in which the molded article is buried in powder mainly comprising aluminum nitride in order to prevent aluminum nitride from evaporating during sintering.

In the case of the atmospheric sintering method, a suitable sintering temperature is in the range of 1,700° to 2,000° C., but in the case of a press sintering method such as a hot press method, the sintering operation is achieved at a temperature of 1,600° to 2,000° C.

According to the method for preparing aluminum nitride of the present invention, the decarbonizing process, viz., the oxidation after-treatment, can be omitted and the aluminum nitride powder can be manufactured economically which has a low carbon and oxygen contents, fine particles which are sufficiently uniform are formed, and a high purity. The aluminum nitride sinter, which has been prepared by molding the aluminum nitride powder into a desired shape of a substrate for a circuit board or the like and then sintering the molded article, is made from the high-purity aluminum nitride containing low amounts of oxygen and remaining carbon and comprising uniform and fine particles. Therefore, the sinter of the present invention has extremely high thermal conductivity and high heat resistance. Thus, this sinter can be used as a high heat releasable substrate in the field of microelectronics.

EXAMPLES

The present invention is described in detail by way of the following examples, which are not intended to limit the scope of the present invention but are merely exemplary.

EXAMPLE 1

In a 300-ml Erlenmeyer flask equipped with a dropping funnel and a three-way cock were placed 50 ml of heptane and 1.5 g of melanine, and the interior of the flask was flushed with nitrogen. A heptane solution, of triethylaluminum (10% by weight) in an amount equimolar with the melamine was added dropwise to the resulting melamine slurry, while the latter was stirred by a magnetic stirrer. After the addition of the solution, the dropping funnel was replaced by a reflux condenser, and heating was carried out under reflux for 3 hours. The formed precipitate which formed was collected by filtration in a nitrogen box, was then washed with heptane, and was dried, thereby obtaining white powder.

This white aluminum nitride precursor was put on an alumina board, and the board was then placed in a silicon carbide furnace. The temperature in the furnace was elevated up to 1,500° C. at a temperature rise rate of 300° C./hour in a nitrogen atmosphere, and this temperature was maintained for 3 hours. The resulting powder was grayish white, and it was confirmed by X-ray diffraction that the powder comprised aluminum nitride. Carbon content in the powder was 2.0% by weight.

EXAMPLE 2

In a 300-ml Erlenmeyer flask equipped with a dropping funnel and a three way cock were placed 50 of heptane and 1.5 g of, melamine, and the interior of the flask was flushed with nitrogen. A heptane solution of diethylaluminum monochloride (10% by weight) in an amount equimolar with the melamine was added dropwise to the resulting melamine slurry, while the latter was stirred by a magnetic stirrer. After the addition of the solution, the dropping funnel was replaced by a reflux condenser, and heating was carried out under reflux for 3 hours. The precipitate which formed was collected by filtration in a nitrogen box, was then washed with heptane, and was dried, thereby obtaining light brown powder.

This aluminum nitride precursor was put on an alumina board, and the board was then placed in a silicon carbide furnace. The temperature in the furnace was elevated up to 1,500° C. at a temperature rise rate of 300° C./hour in a nitrogen atmosphere, and this temperature was maintained for 3 hours. The resulting powder was grayish white, and it was confirmed by X-ray diffraction that the powder comprised aluminum nitride. Carbon content in the powder was 1.8% by weight.

EXAMPLE 3

In a 300 ml Erlenmeyer flask equipped with a dropping funnel and a three-way cock were placed 50 ml of heptane and 1.5 g of, melamine, and the interior of the flask was flushed with nitrogen. A heptane solution of ethylaluminum dichloride (10% by weight) in amounts equimolar with melamine was added dropwise to the resulting melamine slurry, while the latter was stirred by a magnetic stirrer. After the addition of the solution, the dropping funnel was replaced by a reflux condenser, and heating was carried out under reflux for 3 hours. The precipitate which formed was collected by filtration in a nitrogen box, was then washed with heptane, and was dried, thereby obtaining light brown powder.

The thus obtained aluminum nitride precursor was put on an alumina board, and the board was then placed in a silicon carbide furnace. The temperature in the furnace was elevated up to 1,400° C. at a temperature rise rate of 300° C./hour in a nitrogen atmosphere, and this temperature was maintained for 3 hours. The resulting powder was grayish white, and it was confirmed by X-ray diffraction that the powder comprised aluminum nitride. Carbon content in the powder was 1.5% by weight.

EXAMPLE 4

Grayish white aluminum nitride obtained in Example 1 was put on an alumina board, and was heated in air at 750° C. for 4 hours in order to remove its carbon content. The resulting carbon-free powder was inspected by means of X-ray diffraction, and the only peak of aluminum nitride was detected. Oxygen content and carbon content in the powder were 0.7% by weight and 0.1% by weight, respectively.

COMPARATIVE EXAMPLE 1

In a 300-ml Erlenmeyer flask equipped with a dropping funnel and a three-way cock were placed 50 ml of heptane and 1 g of ethylenediamine, and the interior of the flask was flushed with nitrogen. A heptane solution of triethylaluminum (10% by weight) in an amount equimolar with ethylenediamine was added dropwise to the resulting ethylenediamine solution, while the latter was stirred by a magnetic stirrer. After the addition of the solution, the dropping funnel was replaced by a reflux condenser, and heating was carried out under reflux for 3 hours. The precipitate which formed was collected by filtration in a nitrogen box, was then washed with heptane, and was dried, thereby obtaining a light yellow powder.

The thus obtained aluminum nitride precursor was put on an alumina board, and the board was then placed in a silicon carbide furnace. The temperature in the furnace was elevated up to 1,500° C. at a temperature rise rate of 300° C./hour in a nitrogen atmosphere, and this temperature was maintained for 3 hours. The resulting powder had a black color, and it was confirmed by X-ray diffraction that the powder comprised aluminum nitride. Residual carbon content in the powder was 22% by weight.

EXAMPLE 5

In a 300-ml Erlenmeyer flask equipped with a dropping funnel and a three-way cock were placed 50 ml of heptane and 1.5 g of melanine, and the interior of the flask was flushed with nitrogen. A heptane solution of triethylaluminum (10% by weight) in an amount equimolar with the melamine was added dropwise to the resulting melamine slurry, while the latter was stirred by a magnetic stirrer. After the addition of the solution, the dropping funnel was replaced by a reflux condenser, and heating was carried out under reflux for 3 hours. The formed precipitate which formed was collected by filtration in a nitrogen box, was then washed with heptane, and was dried, thereby obtaining white aluminum nitride precursor powder.

The thus obtained aluminum nitride precursor was put on an alumina board, and the board was then placed in a silicon carbide furnace. The temperature in the furnace was elevated up to 1,200° C. at a temperature rise rate of 300° C./hour in an ammonia flow, and this temperature was maintained for 3 hours. The resulting powder was grayish white and, according to the results of X-ray diffraction, a peak corresponding to the peak of aluminum nitride appeared. No other peaks were observed. Carbon and oxygen contents in the powder were 0.01% by weight and 0.5% by weight, respectively.

EXAMPLE 6

The same procedure as in Example 5 was repeated with the exception that a mixed gas comprising nitrogen and hydrogen in a ratio of 1:3 was employed, in order to obtain the aluminum nitride. The thus obtained powder was grayish white, and according to the results of X-ray diffraction, only the peak of aluminum nitride was observed. Carbon and oxygen contents in the powder were 0.01 by weight and 0.4% by weight, respectively.

EXAMPLE 7

The same procedure as in Example 5 was repeated with the exception that the calcination temperature was 1,500° C. The thus obtained aluminum nitride powder was a grayish white color which had nearly white, and according to the results of X-ray diffraction, only the peak of aluminum nitride was observed. Carbon and oxygen contents in the powder were 0.01% by weight and 0.3% by weight, respectively.

EXAMPLE 8

In a 300-ml Erlenmeyer flask equipped with a dropping funnel and a three-way cock were placed 50 ml of heptane and 1.5. g of, melamine, and the interior of the flask was flushed with nitrogen. A heptane solution of triethylaluminum (10% by weight) in an amount equimolar with the melamine was added dropwise to the resulting melamine slurry, while the latter was stirred by a magnetic stirrer. After the addition of the solution, the dropping funnel was replaced by a reflux condenser!, and heating was carried out under reflux for 3 hours. The precipitate which formed was collected by filtration in a nitrogen box, was then washed with heptane, and was dried, thereby obtaining white aluminum nitride precursor powder.

The thus obtained aluminum nitride precursor was put on an alumina board, and the board was then placed in a silicon carbide furnace. The temperature in the furnace was elevated to 800° C. at a temperature rise rate of 300° C./hour, in an ammonia flow in order to perform calcination. The atmosphere in the furnace was then switched to nitrogen, and the temperature therein was elevated up to 1,500° C. and this temperature was then maintained for 3 hours. The resulting powder was grayish white and according to the results of X-ray diffraction, only a peak corresponded to the peak of aluminum nitride appeared. Carbon and oxygen contents in the powder were 0.01% by weight and 0.5% by weight. According to measurement by the BET method, the specific surface area of the powder was 15.2 $m^2/g$, and when the powder was observed by a transparent type electron microscope (TEM), it was confirmed that cohesion of particles was not present, the particles were uniformly distributed in size, and the diameter of each particle was nearly equal to a value which had been calculated from the specific surface area by the BET method.

EXAMPLE 9

The same procedure as in Example 8 was repeated with the exception that the calcination was carried out in a steam of ammonia without switching the atmosphere for the secondary calcination to nitrogen. The thus obtained powder was grayish white and, according to the results of X-ray diffraction, the peak of aluminum nitride was observed. Carbon and oxygen contents in the powder were 0.01% by weight and 0.3% by weight, respectively. The specific surface area of the powder was 5.6 $m^2/g$, and when the powder was observed by a transparent type electron microscope (TEM), it was confirmed that a scattering of coarse cohesive masses each having a diameter of several microns were present in the powder. In other words, the uniform particle distribution as observed in Example 8 was not seen.

EXAMPLE 10

The same procedure as in Example 8 was repeated with the exception that the calcination was carried out first in an ammonia atmosphere up to 600° C. and afterward in a nitrogen atmosphere. The thus obtained powder was grayish white and, according to the results of X-ray diffraction, the peak of aluminum nitride was observed. As a result of analysis, carbon and oxygen contents in the powder were 0.01% by weight and 0.48% by weight, respectively. The specific surface area of the powder was 18.4 $m^2/g$, and when the powder was observed by TEM, it was confirmed that the powder was good quality i.e., cohesion was not present therein, and the particles were uniformly distributed.

EXAMPLE 11

The same procedure as in Example 8 was repeated with the exception that the calcination was carried out first in an ammonia atmosphere up to 1,000° C. and afterward in a nitrogen atmosphere in the calcination process. The thus obtained powder was grayish white and, according to the results of X-ray diffraction, the peak of aluminum nitride was observed. Carbon and oxygen contents in the powder were 0.01% by weight and 0.8% by weight, respectively. The specific surface area of the powder was 13.9 m²/g, and when the powder was observed by TEM, it was confirmed that the powder was of good quality i.e., that any cohesion was not present therein, and the particles were uniformly distributed.

EXAMPLE 12

The same procedure as in Example 1 was repeated with the exception that the 1.5 g of melamine was replaced with 1.8 g of melam. The resulting powder was grayish white, and it was confirmed by the results of X-ray diffraction that the powder was composed of aluminum nitride. Carbon content in the powder was 2.2% by weight.

EXAMPLE 13

The same procedure as in Example 1 was repeated with the exception that the 1.5 g of melamine was replaced with 2.6 g of melem. The resulting powder was grayish white and it was confirmed by the results of X-ray diffraction that the powder was composed of aluminum nitride. Carbon content in the powder was 2.4% by weight.

What is claimed is:

1. An aluminum nitride sinter shaped material, prepared by a process which comprises the steps of (a) reacting an organic aluminum compound with an aminotriazine in a solvent to obtain an aluminum nitride precursor, (b) separating the aluminum nitride precursor from the solvent, (c) heating/calcining the aluminum nitride precursor first in a reducing gas atmosphere at a temperature of 600°-1,300° C. and then successively in an inert gas atmosphere at a temperature of 1,400°-1,650° C., to produce aluminum nitride powder having a carbon content of not more than 0.2% by weight, (d) molding the aluminum nitride powder into a desired shape, and (e) then sintering the thus-shaped material.

2. An aluminum nitride sinter shaped material according to claim 1 wherein the aluminum nitride precursor is obtained as a precipitate.

3. An article of manufacture comprising an alumina circuitboard substrate having, as a coating on a surface thereof, an aluminum nitride sinter shaped material of claim 1.

4. An aluminum nitride sinter shaped material according to claim 1, wherein the aluminum nitride is prepared from an alkylaluminum compound represented by the general formula $$R_n \cdot Al \cdot X_{3-n}$$

wherein R is a lower alkyl group having 1 to 10 carbon atoms, n is 1, 1.5, 2 or 3, and X is a hydrogen atom or a halogen atom; wherein the molar ratio of the number of the amino groups in the aminotriazine compound to the organic aluminum compound is from 1 to 10; wherein the aminotriazine is dispersed in the solvent to from a slurry and this slurry is fed to a reaction zone for reaction with the organic aluminum compound; wherein the aluminum nitride precursor is obtained as a precipitate, which is separated from the solvent prior to the heating-/calcinating step; and wherein the heating/calcination operation of the separated aluminum nitride precursor is carried out at a temperature of 600° C. or more, first in a reducing gas atmosphere and thereafter in an inert gas atmosphere.

5. An article of manufacture comprising an aluminum sinter shaped material according to claim 4, wherein prior to or as part of the sintering step, the aluminum nitride percursor is molded into a shaped material as a coating on an alumina circuitboard substrate.

6. An article of manufacture according to claim 5, wherein the sintering operation is carried out in a non-oxidizing atmosphere. powder into a desired shape, and (e) then sintering the thus shaped material.

7. An aluminum nitride sinter shaped material according to claim 1, wherein the carbon content of the aluminum nitride powder is 0.1% by weight or less.

8. An aluminum nitride sinter shaped material according to claim 1, wherein the carbon content of the aluminum nitride powder is about 0.01% by weight.

9. An article of manufacture comprising an aluminum nitride sinter shaped material according to claim 3, wherein the carbon content of the aluminum nitride powder is 0.1% by weight or less.

10. An article of manufacture comprising an aluminum nitride sinter shaped material according to claim 3, wherein the carbon content of the aluminum nitride powder is about 0.1% by weight.

* * * * *